United States Patent [19]

Permar

[11] Patent Number: 5,462,414
[45] Date of Patent: Oct. 31, 1995

[54] LIQUID TREATMENT APPARATUS FOR PROVIDING A FLOW OF PRESSURIZED LIQUID

[76] Inventor: Clark Permar, P.O. Box 701, Bolinas, Calif. 94924

[21] Appl. No.: 375,530

[22] Filed: Jan. 19, 1995

[51] Int. Cl.$^6$ ............................................. F04B 39/16
[52] U.S. Cl. ........................ 417/313; 417/225; 417/404
[58] Field of Search .................... 417/313, 225, 417/393, 404

[56] References Cited

U.S. PATENT DOCUMENTS 4,793,153  12/1988  Hembree et al. .

Primary Examiner—Richard A. Bertsch
Assistant Examiner—Charles G. Freay
Attorney, Agent, or Firm—Thomas R. Lampe

[57] ABSTRACT

Apparatus for providing a flow of pressurized liquid includes a hydraulic cylinder, a divider within the cylinder interior, and floating piston heads positioned in the cylinder interior on opposite sides of the divider. A double ended ram member is movably mounted in the divider and engages the piston heads. Liquid flow paths extend between subcompartments on opposite sides of the piston heads. A source of pressurized liquid delivers liquid under relatively low pressure to reciprocally move the piston heads and ram member causing intensification of pressure of liquid displaced from the cylinder. In a preferred embodiment, excess pressurized liquid passes through a filter to separate the liquid into permeate and concentrate portions.

10 Claims, 2 Drawing Sheets

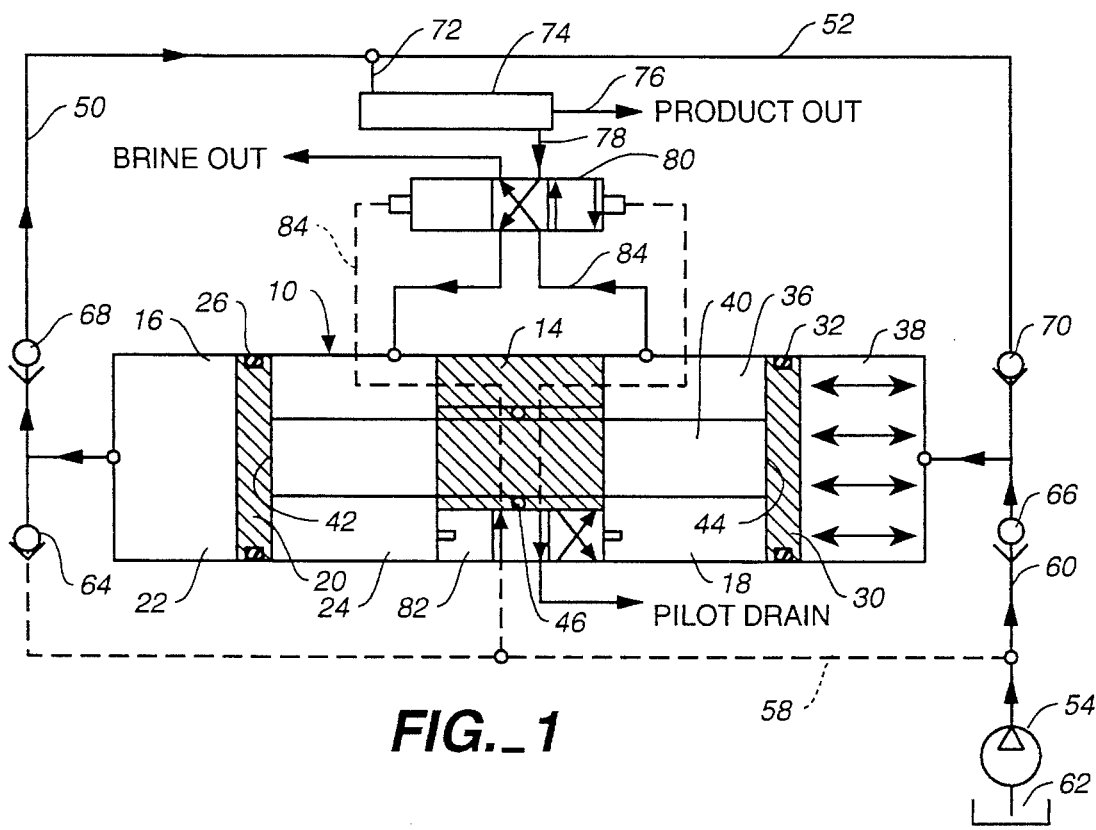
FIG._1
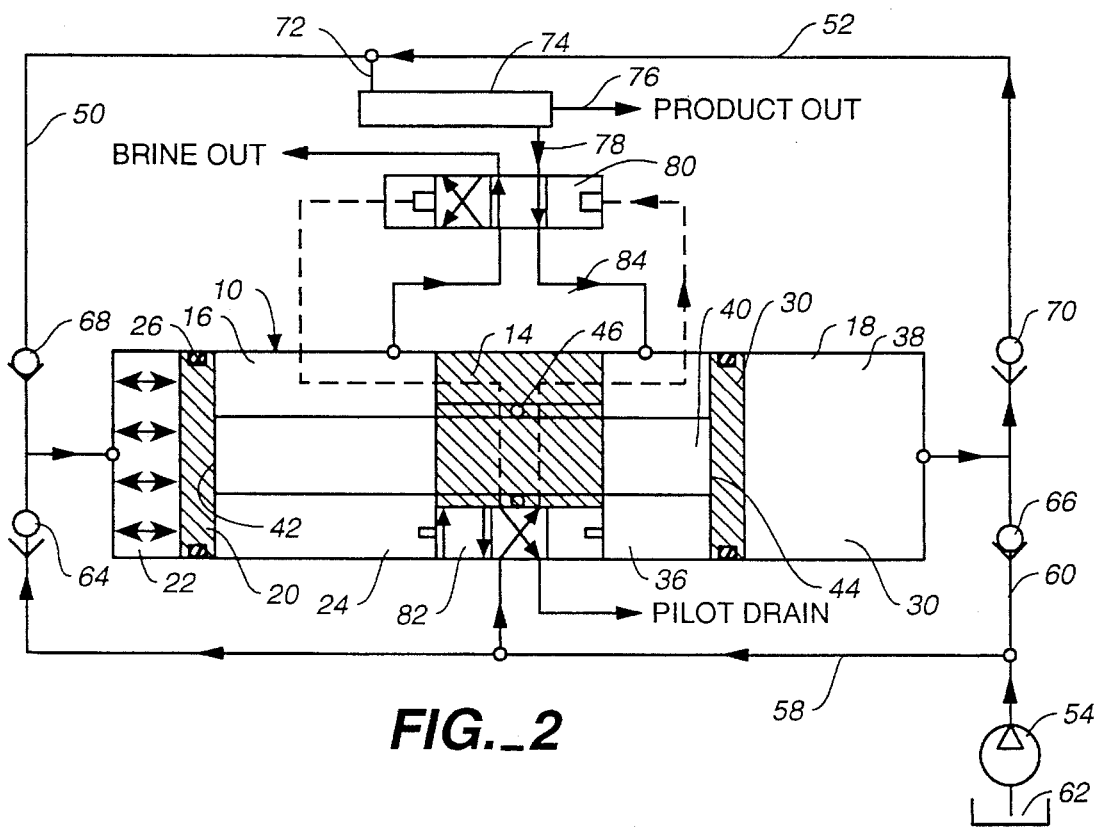
FIG._2

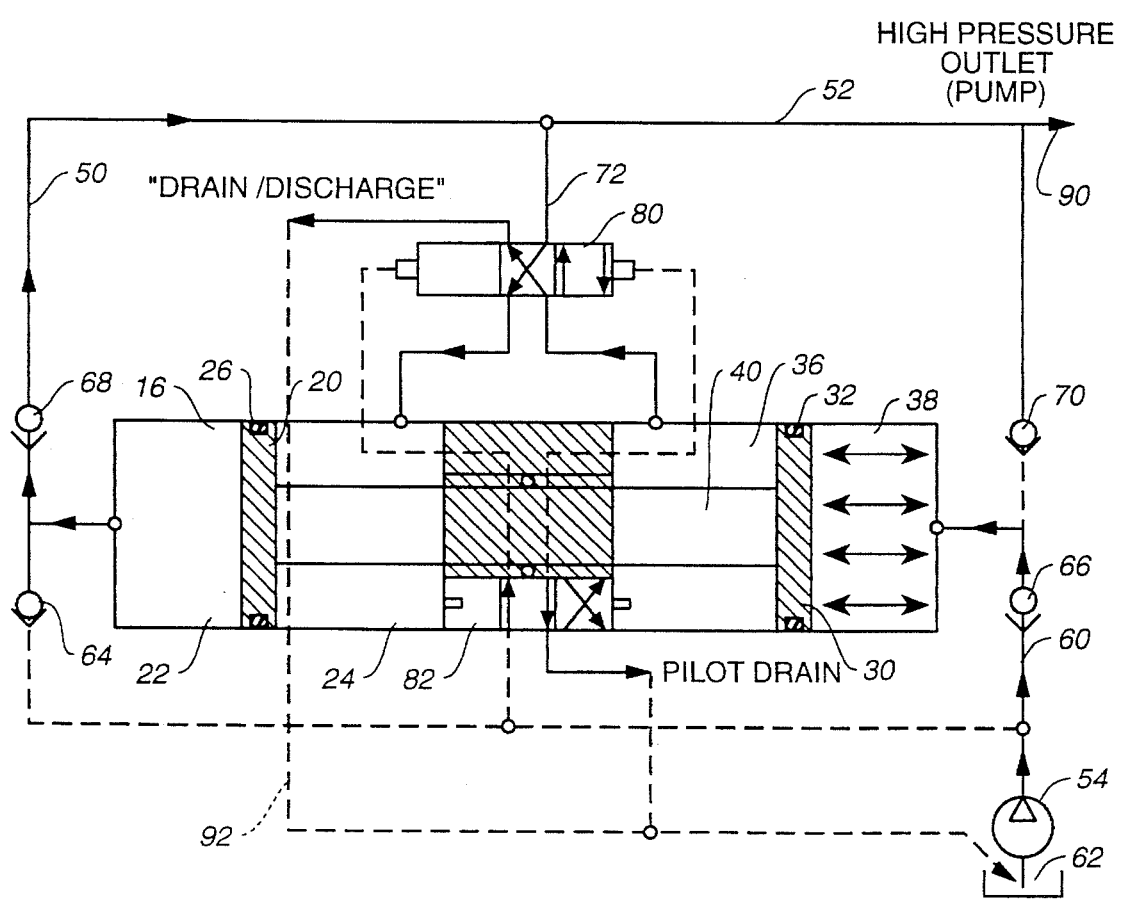
FIG._3

5,462,414

LIQUID TREATMENT APPARATUS FOR PROVIDING A FLOW OF PRESSURIZED LIQUID

TECHNICAL FIELD

This invention relates to apparatus for providing a flow of pressurized liquid. The apparatus has particular application to the filtering of pressurized liquid to separate the pressurized liquid into a permeate portion and a concentrate portion and may be utilized for the desalinization of sea water.

BACKGROUND ART

My pending U.S. patent application Ser. No. 08/228,884, filed Apr. 18, 1994, discloses a system which can be utilized to desalinate sea water. There are, of course, many prior art systems which utilize reverse osmosis to accomplish such objective. Typically, prior art desalinization systems are very expensive to operate and difficult to service. The system of my above-referenced pending U.S. patent application Ser. No. 08/228,884, filed Apr. 18, 1994, addresses this problem. The apparatus disclosed and claimed herein represents another approach to solving the problems inherent in the prior art.

The apparatus of the present invention utilizes a piston of a particular character in the apparatus. While reversible pistons per se are known in the prior art as part of hydraulic circuits, the character of the piston and related mechanism employed in the present system differs in regard to both structure and manner of operation. U.S. Pat. No. 4,793,153, issued Dec. 27, 1988 discloses a typical prior art hydraulic circuit employing a reversible piston to accomplish "energy recovery" in a mixed-phase motor in a refrigeration system.

DISCLOSURE OF INVENTION

The apparatus of the present invention provides a highly efficient, relatively low-cost approach for desalinization of sea water or for other operations wherein it is desired to flow a liquid under intensified pressure conditions. The apparatus employs a minimal number of seals and can be powered by liquid under low pressure, such as that produced by a conventional low pressure pump.

The present apparatus employs a minimal number of operating parts which cooperate to substantially increase the pressure of the liquid as compared to the pressure thereof when introduced into the apparatus or system. High pressures can readily be developed with the present invention, thus making it ideal for cross-flow filtration applications, including reverse osmosis filtration systems, wherein high pressures are necessary. The apparatus can also be utilized as a fluid powered high pressure pump for other applications.

The liquid treatment apparatus of the present invention is for providing a flow of pressurized liquid and includes a hydraulic cylinder defining a cylinder interior.

A divider divides the cylinder interior into first and second compartments.

A first piston head is within the cylinder interior, the first piston head being movably mounted in the first compartment and forming a liquid-tight seal with the hydraulic cylinder to subdivide the first compartment to a first set of two subcompartments, said subcompartments of the first set of two subcompartments located at opposed sides of the first piston head.

A second piston head is within the cylinder interior spaced from the first piston head, the second piston head being movably mounted in the second compartment and forming a liquid-tight seal with the hydraulic cylinder to divide the second compartment into a second set of two subcompartments, said subcompartments of the second set of two subcompartments located at opposed sides of the second piston head.

A double-ended ram member is movably mounted within the cylinder interior and located between the first piston head and the second piston head. A first end of the ram member is unattached to but engageable with the first piston head within a single subcompartment of the first set of two subcompartments and a second end of the ram member is unattached to but engageable with the second piston head within a single subcompartment of the second set of subcompartments. The ram member extends through the divider, is movable relative to the divider, and forms a fluid-tight seal with the divider.

The apparatus also includes first liquid flow path defining means defining a first liquid flow path extending between the two subcompartments of the first set of two subcompartments.

Second liquid flow path defining means defines a second liquid flow path extending between the two subcompartments of the second set of two subcompartments.

Pressurized liquid delivery means is provided having an outlet for pressurized liquid. Control means alternately introduces pressurized liquid from the pressurized liquid delivery means outlet into the first and second compartments to cause reciprocal movement of the piston heads and ram member within the cylinder interior and pressurization and flow of liquid through the liquid flow paths from the subcompartments of the sets of two subcompartments not accommodating a ram member end to their respective subcompartments accommodating a ram member end.

Liquid exit flow path defining means defines a liquid exit path communicating with the liquid flow paths for discharging excess pressurized liquid from the subcompartments not accommodating a ram member end and not entering the subcompartments accommodating a ram member end.

In a preferred embodiment, the apparatus includes filter means operatively associated with the first and second liquid flow path defining means for receiving pressurized liquid from the first and second liquid flow paths and filtering the pressurized liquid.

Other features, advantages, and objects of the present invention will become apparent with reference to the following description and accompanying drawings.

BRIEF DESCRIPTION OF DRAWINGS

FIG. 1 is a schematic view illustrating an embodiment of apparatus constructed in accordance with the teachings of the present invention incorporating a filter, the embodiment shown during one stage of operation thereof;

FIG. 2 is a view similar to FIG. 1 but illustrating the apparatus embodiment during another stage of operation; and FIG. 3 is a view similar to FIG. 1 but of an embodiment of the apparatus not employing a filter.

MODES FOR CARRYING OUT THE INVENTION

Referring now to FIGS. 1 and 2, apparatus constructed in accordance with the teachings of the present invention includes a hydraulic cylinder 10 defining a cylinder interior 12. A divider 14 is disposed within the cylinder interior and divides the cylinder interior into first compartment 16 and second compartment 18.

A first floating piston head 20 is movably mounted in the first compartment 16 and subdivides the first compartment into a first set of two subcompartments 22, 24 located at opposed sides of the first piston head 20. A seal 26 is disposed about first piston head 20 to maintain a fluid-tight seal with the hydraulic cylinder.

A second piston head 30 having a seal 32 thereabout is movably mounted in second compartment 18 forming a liquid-tight seal with the hydraulic cylinder and dividing the second compartment into a second set of two subcompartments 36, 38. Subcompartments 36, 38 are located at opposed sides of the second piston head 30. Piston heads 20, 30 are in the nature of floating piston heads, slidable back and forth within their respective compartments upon application of outside forces thereto.

A double-ended ram member 40 is movably mounted within the cylinder interior and located between piston heads 20, 30. One end 42 of the ram member is unattached to but engageable with the first piston head within subcompartment 22. The other end 44 of the ram member is unattached to but engageable with second piston head 30 within subcompartment 36. This arrangement compensates for any misalignment and extends the life of seals associated with the piston heads.

The ram member 40 extends through divider 14, is reciprocally movable relative to the divider, and forms a fluid-tight seal with the divider. An O-ring 46 is illustrated for such latter purpose.

A conduit or flow line 50 defines a liquid flow path extending between subcompartments 22 and 24. A conduit or flow line 52 extends between subcompartments 56 and 58.

A pump 54 has an outlet 56 communicating with flow lines 58, 60, the pump pumping liquid from a source or supply thereof 62. The liquid may, for example, be sea water. Flow lines 58, 60 communicate respectively with flow lines 50, 52 through check valves 64 and 66. Check valves 68, 70 are disposed in flow lines 50, 52, respectively, as illustrated.

Flow lines 50 and 52 converge at a common flow line 72 leading to the input of a reverse osmosis filter 74 which may be of any suitable well known construction. As is conventional, reverse osmosis filter 74 will serve to separate out a permeate portion in the form of fresh water if the sea water introduced thereinto is pressurized to a certain extent. Arrow 76 in the drawings indicates the flow of a permeate or product portion out of the filter.

The remaining portion, the concentrate or brine portion, flows through a conduit 78 and thence through a retrack valve 80. A segment of flow line 50 between retrack valve 80 and cylinder 10 delivers the concentrate or brine portion to the subcompartment 24 as indicated by the arrows.

The positioning of retrack valve 80 is determined by the positioning of an associated pilot valve 82. In FIG. 1, both the retrack valve 80 and pilot valve 82 are in their respective right-most positions wherein pressurized liquid from pump 54 will pass from line or conduit 58 through pilot valve 82 and thence through a conduit 84 to the left end of retrack valve 80.

Also with reference to FIG. 1, the pressurized liquid from pump 54 will displace check valve 66 and pass into subcompartment 38 as indicated by the arrows. This will cause a build-up of liquid pressure in the subcompartment 38 urging second piston head 30 to the left as shown in FIG. 1.

The second piston head will engage end 44 of ram member 40 causing the ram member to move left and engage first piston head 20 at end 42 of the ram member.

Piston head 20 will cause displacement of liquid in first compartment 16 into flow line or conduit 50 and displacement of check valve 68.

The liquid displaced from first compartment 16 will then enter filter 74 with a portion thereof passing as previously described through conduit 78 and retrack valve 80 into subcompartment 24. It will be appreciated, however, that not all of the liquid displaced from subcompartment 22 will enter subcompartment 24, because a portion of the ram member occupies the subcompartment 24. That is, the volume of subcompartment 22 will decrease at a faster rate than the volume of subcompartment 24 increases. This will result in substantial pressurization of the liquid exiting subcompartment 22, with the difference in the amount of liquid being forced to pass out of the reverse osmosis filter 74 as permeate due to closure of check valve 70 in line 52.

During this stage of the operation, the pressure of the liquid in subcompartment 36 will be essentially zero since the liquid contents thereof (brine in the case of salt water) will pass through a discharge line 84 through retrack valve 80.

In summary, the liquid in subcompartment 38 will be at the outlet or pressure of pump 54, e.g. 80 psi. The pressure in subcompartment 36 will be essentially zero, and the pressure of liquid in subcompartments 22, 24 will be considerably higher, e.g. 800 psi. The amount of increase will generally correspond to the ratio of the cross-sectional area of the ram to the cross-sectional area of the cylinder.

FIG. 2 illustrates the situation which exists sometime after second piston head 30 has contacted pilot valve 82 and displaced same to the left along with consequent displacement to the left of retrack valve 80. Now the pump 54 directs pressurized liquid to subcompartment 22 with piston heads 20 and 30 and ram member 40 moving to the right to pressurize liquid in subcompartments 36, 38 with consequent discharge of highly pressurized liquid from subcompartment 38 through filter 74, retrack valve 80 and into subcompartment 36, the excess highly pressurized liquid exiting the filter 74 as a permeate portion in the form of fresh water. Of course, this entire cycle will keep repeating itself as long as pump 54 delivers drive pressure fluid to the rest of the system.

FIG. 3 illustrates an alternative embodiment wherein the apparatus does not incorporate a filter. Excess high pressure liquid (the amount that cannot be accommodated by a subcompartment housing a ram member end), rather than being directed through a filter, is delivered to an outlet 90. Thus, this form of the apparatus can be considered in the nature of a high pressure pump which receives liquid under relatively low pressure, intensifies the liquid pressure, and delivers a portion of the pressure intensified liquid to a given location. The arrangement of FIG. 3 also differs from that of FIGS. 1 and 2 in that it is essentially a "closed" system with drain or discharge passing through retrack valve 80 flowing through line 92 back to liquid supply source 62. Likewise, the pilot drain liquid can also be returned to the source as shown.

I claim:

1. Liquid treatment apparatus for providing a flow of pressurized liquid, said apparatus comprising, in combination:

a hydraulic cylinder defining a cylinder interior;

a divider dividing said cylinder interior into first and second compartments;

a first piston head within said cylinder interior, said first piston head being movably mounted in said first compartment and forming a liquid-tight seal with said hydraulic cylinder to subdivide said first compartment into a first set of two subcompartments, said subcompartments of said first set of two subcompartments located at opposed sides of said first piston head;

a second piston head within said cylinder interior spaced from said first piston head, said second piston head being movably mounted in said second compartment and forming a liquid-tight seal with said hydraulic cylinder to divide said second compartment into a second set of two subcompartments, said subcompartments of said second set of two subcompartments located at opposed sides of said second piston head;

a double-ended ram member movably mounted within said cylinder interior and located between said first piston head and said second piston head, with a first end of said ram member unattached to but engageable with said first piston head within a single subcompartment of said first set of two subcompartments and a second end of said ram member unattached to but engageable with said second piston head within a single subcompartment of said second set of two subcompartments, said ram member extending through said divider, movable relative to said divider, and forming a fluid-tight seal with said divider;

first liquid flow path defining means defining a first liquid flow path extending between the two subcompartments of said first set of two subcompartments;

second liquid flow path defining means defining a second liquid flow path extending between the two subcompartments of said second set of two subcompartments;

pressurized liquid delivery means having an outlet for pressurized liquid;

control means for alternately introducing pressurized liquid from said pressurized liquid delivery means outlet into said first and second compartments to cause reciprocal movement of said piston heads and ram member within said cylinder interior and pressurization and flow of liquid through said liquid flow paths from the subcompartments of the sets of two subcompartments not accommodating a ram member end to their respective subcompartments accommodating a ram member end; and liquid exit path defining means defining a liquid exit path communicating with said liquid flow paths for discharging excess pressurized liquid from the subcompartments not accommodating a ram member end and not entering the subcompartments accommodating a ram member end.

2. The apparatus according to claim 1 additionally comprising filter means operatively associated with said first and second liquid flow path defining means for receiving pressurized liquid from said first and second liquid flow paths and filtering said pressurized liquid.

3. The apparatus according to claim 2 wherein said filter means is operable to separate the pressurized liquid received from said first and second liquid flow paths into a permeate portion and a concentrate portion, said filter means having a permeate portion exit and a concentrate portion exit.

4. The apparatus according to claim 3 wherein said filter means is in said liquid exit path and wherein said excess pressurized liquid comprises said permeate portion.

5. The apparatus according to claim 2 wherein said filter means comprises a reverse osmosis filter.

6. The apparatus according to claim 1 wherein said control means includes valve means for alternatively directing pressurized liquid from said liquid delivery means outlet to the subcompartments of the sets of two subcompartments not accommodating a ram member end.

7. The apparatus according to claim 6 wherein said valve means includes a pilot valve alternately actuated in response to movement of said first and second piston heads and movable between a first pilot valve position and a second pilot valve position.

8. The apparatus according to claim 7 additionally comprising a retrack valve in operative association with said pilot valve and with said first and second liquid flow path defining means to alternately open and close said first and second liquid flow paths responsive to positioning of said pilot valve.

9. The apparatus according to claim 8 wherein said retrack valve defines at least one outlet for draining liquid from the subcompartments accommodating a ram member end.

10. The apparatus according to claim 9 including means for recirculating liquid drained from the subcompartments accommodating a ram member end.

* * * * *

(12) EX PARTE REEXAMINATION CERTIFICATE (5578th)
United States Patent
Permar

(10) Number: US 5,462,414 C1
(45) Certificate Issued: Oct. 24, 2006

(54) LIQUID TREATMENT APPARATUS FOR PROVIDING A FLOW OF PRESSURIZED LIQUID

(76) Inventor: Clark Permar, P.O. Box 701, Bolinas, CA (US) 94924

Reexamination Request:
No. 90/006,952, Feb. 25, 2004

Reexamination Certificate for:
Patent No.: 5,462,414
Issued: Oct. 31, 1995
Appl. No.: 08/375,530
Filed: Jan. 19, 1995

(51) Int. Cl.
*F04B 23/00* (2006.01)

(52) U.S. Cl. .................. 417/313; 417/225; 417/404; 210/137; 210/416.1

(58) Field of Classification Search .................. None
See application file for complete search history.

(56) References Cited

U.S. PATENT DOCUMENTS

| | | | |
|---|---|---|---|
| 4,350,266 A | 9/1982 | Hetherington et al. | |
| 4,367,140 A | * 1/1983 | Wilson | ........................ 210/110 |
| 4,674,958 A | 6/1987 | Igarashi et al. | |
| 4,960,039 A | * 10/1990 | Robertson | .................. 92/165 R |
| 5,462,414 A | * 10/1995 | Permar | ........................ 417/313 |

FOREIGN PATENT DOCUMENTS

EP    0 132 913    * 2/1985

OTHER PUBLICATIONS

ANSI Y32.10 graphic symbols.

* cited by examiner

*Primary Examiner*—Andres Kashnikow

(57) ABSTRACT

Apparatus for providing a flow of pressurized liquid includes a hydraulic cylinder, a divider within the cylinder interior, and floating piston heads positioned in the cylinder interior on opposite sides of the divider. A double ended ram member is movably mounted in the divider and engages the piston heads. Liquid flow paths extend between subcompartments on opposite sides of the piston heads. A source of pressurized liquid delivers liquid under relatively low pressure to reciprocally move the piston heads and ram member causing intensification of pressure of liquid displaced from the cylinder. In a preferred embodiment, excess pressurized liquid passes through a filter to separate the liquid into permeate and concentrate portions.

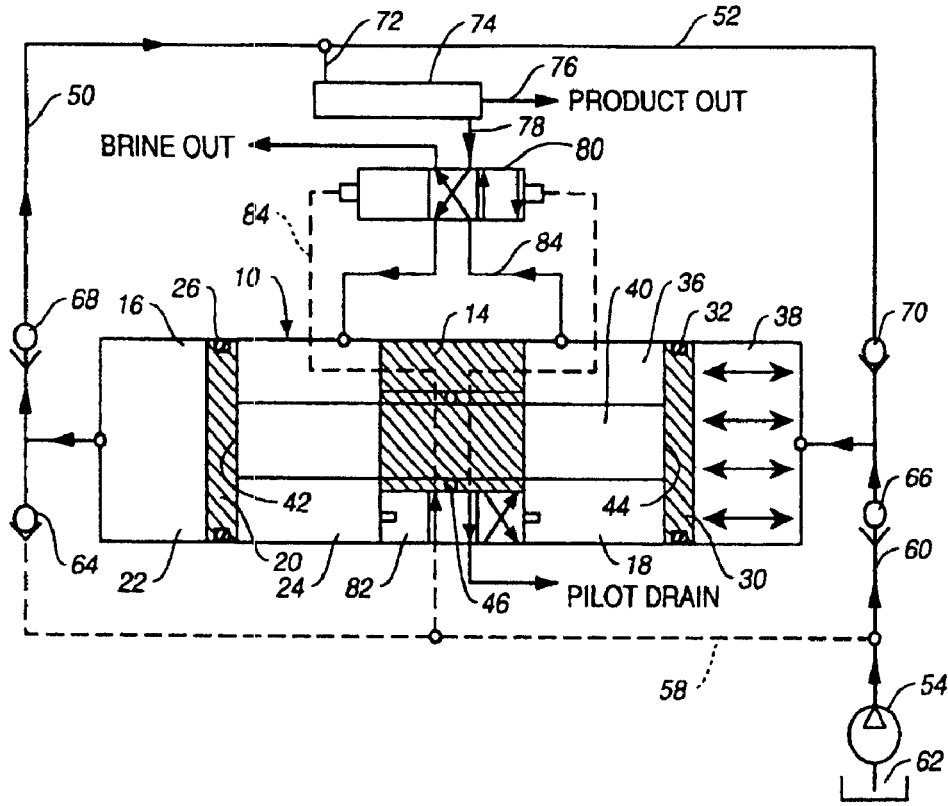

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 8–10 is confirmed.

Claims 1–7 are cancelled.

\* \* \* \* \*

EX PARTE REEXAMINATION CERTIFICATE (6521st)

United States Patent
Permar

(10) Number: US 5,462,414 C2
(45) Certificate Issued: Nov. 11, 2008

(54) LIQUID TREATMENT APPARATUS FOR PROVIDING A FLOW OF PRESSURIZED LIQUID

(76) Inventor: Clark Permar, P.O. Box 701, Bolinas, CA (US) 94924

Reexamination Request:
No. 90/008,907, Oct. 30, 2007

Reexamination Certificate for:
Patent No.: 5,462,414
Issued: Oct. 31, 1995
Appl. No.: 08/375,530
Filed: Jan. 19, 1995

Reexamination Certificate C1 5,462,414 issued Oct. 24, 2006

(51) Int. Cl.
*F04B 9/00* (2006.01)
*F04B 9/115* (2006.01)
*F04B 39/16* (2006.01)
*B01D 61/10* (2006.01)
*B01D 61/02* (2006.01)

(52) U.S. Cl. .................. 417/313; 210/137; 210/416.1; 417/225; 417/404
(58) Field of Classification Search ................ None
See application file for complete search history.

(56) References Cited

U.S. PATENT DOCUMENTS

| 4,021,149 A | 5/1977 | Rutenberg et al. ........... 417/395 |
| 4,523,895 A | 6/1985 | Silva ........................... 417/225 |

*Primary Examiner*—David O. Reip

(57) ABSTRACT

Apparatus for providing a flow of pressurized liquid includes a hydraulic cylinder, a divider within the cylinder interior, and floating piston heads positioned in the cylinder interior on opposite sides of the divider. A double ended ram member is movably mounted in the divider and engages the piston heads. Liquid flow paths extend between subcompartments on opposite sides of the piston heads. A source of pressurized liquid delivers liquid under relatively low pressure to reciprocally move the piston heads and ram member causing intensification of pressure of liquid displaced from the cylinder. In a preferred embodiment, excess pressurized liquid passes through a filter to separate the liquid into permeate and concentrate portions.

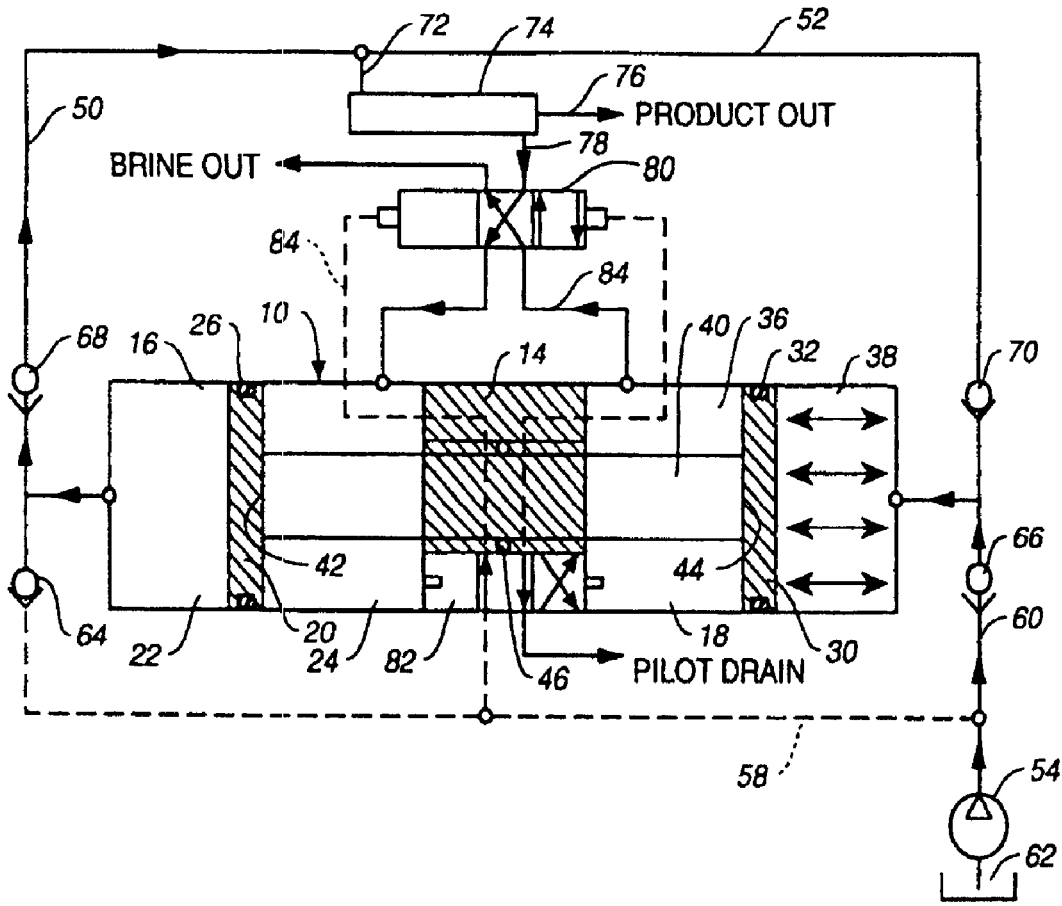

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 8–10 is confirmed.

Claims 1–7 were previously cancelled.

New claims 11 and 12 are added and determined to be patentable.

*11. The apparatus according to claim 8 wherein the retrack valve is coupled to said first and second liquid flow paths.*

*12. The apparatus according to claim 8 wherein said first and second liquid flow paths extend through the retrack valve.*

\* \* \* \* \*